United States Patent Office 2,825,646
Patented Mar. 4, 1958

2,825,646

REDUCING THE ASH CONTENT OF CELLULOSE

Morris Wayman and Helge P. Holkestad, Prince Rupert, British Columbia, Canada, assignors to Columbia Cellulose Company, Ltd., Prince Rupert, British Columbia, Canada, a company of British Columbia No Drawing. Application September 27, 1954
Serial No. 458,692

12 Claims. (Cl. 92—9)

This invention relates to cellulose and relates more particularly to a process for the production of cellulose having a low ash content.

Cellulose that is to be employed for chemical purposes, as, for example, the manufacture of cellulose esters and cellulose ethers should have a minimum content of impurities. To achieve this end it is common to subject the raw cellulose, which may be wood pulp or the like, to an extensive purification involving chlorination, bleaching, alkali treatments and washing, during which treatments the proportion of such impurities in the cellulose as lignin, pentosans and coloring matters is reduced to extremely low levels. These treatments, however, leave in the cellulose a certain proportion of inorganic materials, such as the compounds of calcium, magnesium, aluminum, silicon, and iron, which are normally determined as ash, whose presence may interfere with the successful manufacture of cellulose derivatives therefrom, or which may affect the properties of such cellulose derivatives in an adverse manner. The inorganic materials in the cellulose may have been derived from the wood or other starting material from which the raw cellulose is produced, or may have been introduced into the cellulose at any stage during its production, as by contamination from the treating vessels or from the treating reagents. Regradless of their source, it is not possible to remove these inorganic materials from the cellulose readily by washing with water, possibly because of the high adsorptive power of the cellulose, the formation of chemical linkages, or the like.

It is an important object of this invention to provide a process for the production of cellulose which will be free from the foregoing and other difficulties.

A further object of this invention is to provide a process for the production of cellulose having a low ash content by washing the cellulose with an aqueous solution of an aldohexonic acid, its lactone or its salt.

Other objects of this invention will be apparent from the following detailed description and claims.

According to the present invention, it has been found that the ash content of cellulose may be considerably reduced by washing the said cellulose with an aqueous solution of an aldohexonic acid, its lactone or its salt. The term "aldohexonic acid" is employed herein to designate acids having the formula $HOCH_2—(CHOH)_4—COOH$, such as gluconic, talonic, galactonic, idonic, gulonic, mannonic, altronic, and allonic acids, in both their dextro and levo forms. These acids, in aqueous solution, exist in equilibrium with their lactones. In use, there may be employed the aldohexonic acid, itself, its lactone, or commerical preparations containing a mixture of the two. There may also be employed a soluble salt of the aldohexonic acid such as the sodium or potassium salt thereof. Cellulose that has been washed with an aqueous solution of these materials has a much lower ash content than cellulose that has not been so treated. The action of the aldohexonic acid, its lactone or its salt in reducing the ash content of the cellulose is unique in that washing the cellulose with metaphosphates and polyamino carboxylic acid sequestering agents does not reduce the ash content of the cellulose and may actually increase the same.

In carrying out the process of this invention, the cellulose is washed with an aqueous solution of an aldohexonic acid, its lactone, or its salt, having a concentration of between about 0.05 and 5.0% by weight, or preferably between about 0.1 and 1.0% by weight. The washing is carried out with the cellulose concentration ranging between about 0.4 and 12% by weight. The temperature of the wash liquid is not critical and may range from about 5 to 50° C. During the wash, the pH of the wash liquid should be between about 3.5 and 7.5. The time of washing may range between about 1 and 60 minutes, but is not critical so long as there is a thorough washing of all the cellulose under the conditions of washing. Following the washing with the aqueous solution specified, the cellulose is washed further with water to remove therefrom the aldohexonic acid, its lactone or its salt together with the inorganic compounds these substances remove from the cellulose.

The washing of the cellulose with an aqueous solution of an aldohexonic acid, its lactone, or its salt may be applied to the cellulose at any desired point in its purification and will effect some reduction in the ash content thereof. However, the best results are obtained when the cellulose is washed with the said solution as one of the final steps in its processing so as to avoid the possibility that the cellulose will be contaminated with further quantities of inorganic compounds during subsequent steps in its processing. Cellulose that has been treated in accordance with this invention is eminently suited for chemical purposes, as for the manufacture of cellulose esters and ethers, or for other uses where cellulose having a low ash content is desirable.

The following example is given to illustrate this invention further.

*Example*

A sulfite wood pulp that has been purified in the manner described in U. S. Patent No. 2,558,054, to M. E. Martin et al., is washed in the form of a 6% slurry for 5 minutes with a 1% aqueous solution of glucono-delta-lactone at a temperature of 20° C. and a pH of 6. The cellulose is then thickened and washed with water, following which it is thickened and dried. The ash content of the cellulose is reduced from 0.10% to 0.03%. The reduction in the ash content of the cellulose involves a substantially complete removal therefrom of aluminum compounds, a reduction in the order of 70–80% of silica, but substantially no change in the iron content of the cellulose.

It is to be understood that the foregoing detailed description is merely given by way of illustration and that many variations may be made therein without departing from the spirit of our invention.

Having described our invention, what we desire to secure by Letters Patent is:

1. A process for reducing the ash content of cellulose which comprises washing the cellulose with an aqueous solution of a member of the group consisting of aldohexonic acids, their lactones and their salts.

2. A process for reducing the ash content of cellulose which comprises washing cellulose at a concentration between 0.4 and 12% by weight and at a pH between 3.5 and 7.5 with an aqueous solution having a concentration between 0.05 and 5.0% by weight of a member of the group consisting of aldohexonic acids, their lactones and their salts.

3. A process for reducing the ash content of cellulose which comprises washing the cellulose with a 0.05 to 5.0% by weight aqueous solution of a member of the group consisting of aldohexonic acids, their lactones and their salts.

4. A process for reducing the ash content of cellulose which comprises washing the cellulose with an aqueous solution of a member of the group consisting of aldohexonic acids, their lactones and their salts, and thereafter washing the cellulose with water.

5. A process for reducing the ash content of cellulose which comprises purifying the cellulose, and washing the cellulose with an aqueous solution of a member of the group consisting of aldohexonic acids, their lactones and their salts.

6. A process for reducing the ash content of cellulose which comprises purifying the cellulose, washing the cellulose with an aqueous solution of a member of the group consisting of aldohexonic acids, their lactones and their salts, and thereafter washing the cellulose with water.

7. A process for reducing the ash content of wood pulp which comprises washing the wood pulp with an aqueous solution of a member of the group consisting of aldohexonic acids, their lactones and their salts.

8. A process for reducing the ash content of wood pulp which comprises washing the wood pulp with an aqueous solution of glucono-delta-lactone.

9. A process for reducing the ash content of wood pulp which comprises washing wood pulp at a concentration between 0.4 and 12% by weight and at a pH between 3.5 and 7.5 with an aqueous solution having a concentration between 0.05 and 5.0% by weight of glucono-delta-lactone.

10. A process for reducing the ash content of wood pulp which comprises washing the wood pulp with an aqueous solution of glucono-delta-lactone, and thereafter washing the wood pulp with water.

11. A process for reducing the ash content of wood pulp which comprises purifying the wood plup, washing the wood pulp with an aqueous solution of glucono-delta-lactone, and thereafter washing the wood pulp with water.

12. A process for reducing the ash content of wood pulp which comprises purifying the wood pulp, washing the wood pulp with a 0.05 to 5.0% by weight aqueous solution of glucono-delta-lactone, and thereafter washing the wood pulp with water.

References Cited in the file of this patent

UNITED STATES PATENTS 2,236,970    Goldfarb _____ Apr. 1, 1941

OTHER REFERENCES

Wise: Wood Chemistry (1944), page 750.
Adler: The Institute of Paper Chemistry, vol. 17, page 39 (1947).